US012599984B2

(12) United States Patent
Stahel et al.

(10) Patent No.: US 12,599,984 B2
(45) Date of Patent: Apr. 14, 2026

(54) FASTENING METHOD

(71) Applicant: HILTI AKTIENGESELLSCHAFT, Schaan (LI)

(72) Inventors: Simon Stahel, Chur (CH); Uwe Popp, Widnau (CH)

(73) Assignee: HILTI AKTIENGESELLSCHAFT, Schaan (LI)

( * ) Notice: Subject to any disclaimer, the term of this patent is extended or adjusted under 35 U.S.C. 154(b) by 1490 days.

(21) Appl. No.: 16/651,650

(22) PCT Filed: Oct. 2, 2018

(86) PCT No.: PCT/EP2018/076739

§ 371 (c)(1),
(2) Date: Mar. 27, 2020

(87) PCT Pub. No.: WO2019/072629

PCT Pub. Date: Apr. 18, 2019

(65) Prior Publication Data

US 2020/0306857 A1     Oct. 1, 2020

(30) Foreign Application Priority Data

Oct. 9, 2017     (EP) ..................................... 17195387

(51) Int. Cl.
*B23K 9/007*           (2006.01)
(52) U.S. Cl.
CPC .................................... *B23K 9/007* (2013.01)
(58) Field of Classification Search
CPC . B23K 9/20; B23K 9/007; B23K 9/00; B23K 9/201; B23K 11/0066; B23K 11/004; B23K 11/002; B23K 26/20; B23K 26/21; B23K 26/323

USPC ........................................ 219/98, 99; 29/456
See application file for complete search history.

(56) References Cited

U.S. PATENT DOCUMENTS

| | | | |
|---|---|---|---|
| 393,887 A | 12/1888 | Couche | |
| 3,993,887 A * | 11/1976 | Richards | B23K 9/206 |
| | | | 219/99 |
| 4,092,514 A | 5/1978 | Burton | |
| 4,482,795 A | 11/1984 | Hinden | |
| 6,762,392 B1 | 7/2004 | Krengel et al. | |
| 8,425,167 B2 | 4/2013 | Miura | |
| 9,085,042 B2 | 7/2015 | Bruck | |
| 9,601,837 B2 * | 3/2017 | Dupuis | H01R 13/6215 |

(Continued)

FOREIGN PATENT DOCUMENTS

| | | |
|---|---|---|
| CA | 1059220 A | 7/1979 |
| CN | 101143402 A | 3/2008 |

(Continued)

OTHER PUBLICATIONS

International Bureau, International Search Report in International Application No. PCT/EP2018/076739, mailed Nov. 20, 2018.

*Primary Examiner* — Steven W Crabb
*Assistant Examiner* — Alba T Rosario-Aponte
(74) *Attorney, Agent, or Firm* — Leydig, Voit & Mayer, Ltd.

(57)           ABSTRACT

A method is provided for fastening a stud to a substrate having a surface layer, in which a recess is created in the substrate, the stud is connected to the substrate in the recess, and the recess around the stud is covered.

21 Claims, 4 Drawing Sheets

(56)                References Cited

U.S. PATENT DOCUMENTS

| | | | | |
|---|---|---|---|---|
| 2005/0161442 A1* | 7/2005 | Bradley | ................. | B23K 9/201 |
| | | | | 219/99 |
| 2006/0193714 A1 | 8/2006 | Werner | | |
| 2010/0119772 A1 | 5/2010 | Christ et al. | | |
| 2010/0288736 A1* | 11/2010 | Miura | .................... | B23K 9/207 |
| | | | | 219/99 |
| 2011/0033260 A1* | 2/2011 | Miura | ............... | B23K 35/0288 |
| | | | | 219/98 |
| 2013/0263434 A1* | 10/2013 | Gugel | ................... | B23K 9/205 |
| | | | | 219/136 |
| 2014/0044984 A1* | 2/2014 | Bruck | ................... | B23K 9/201 |
| | | | | 219/137 R |
| 2020/0306857 A1 | 10/2020 | Stahel et al. | | |

FOREIGN PATENT DOCUMENTS

| | | | |
|---|---|---|---|
| CN | 102689086 A | | 9/2012 |
| CN | 103917324 A | | 7/2014 |
| CN | 103061333 B | | 12/2014 |
| CN | 204183086 U | | 3/2015 |
| CN | 105269128 A | | 1/2016 |
| DE | 87 13 476 U1 | | 11/1987 |
| DE | 19925628 A1 | | 12/2000 |
| DE | 102005005519 A1 | | 8/2006 |
| EP | 1712326 A2 | | 10/2006 |
| GB | 2283293 A | | 5/1995 |
| JP | H10-128543 A | | 5/1998 |
| JP | 2000-141045 A | | 5/2000 |
| JP | 2003062670 A | | 3/2003 |
| JP | 2011-038578 A | | 2/2011 |
| JP | 2015-531039 A | | 10/2015 |
| RU | 2 191 099 C2 | | 10/2002 |
| SU | 1692784 A1 | * | 11/1991 |
| UA | 100452 C2 | | 12/2012 |
| WO | WO 2013/064618 A1 | | 5/2013 |

* cited by examiner

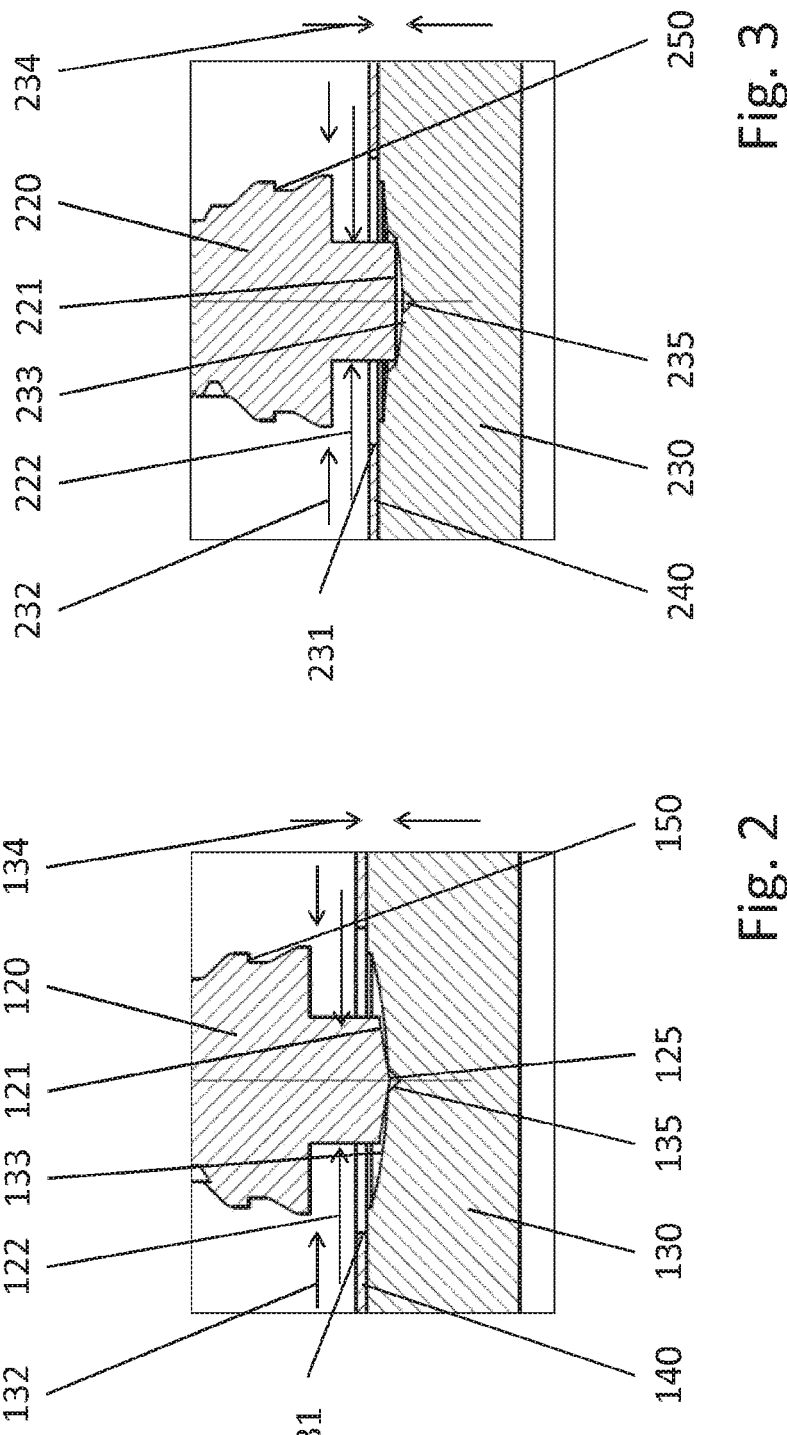

FASTENING METHOD

CROSS-REFERENCE TO RELATED APPLICATIONS

This patent application is the U.S. National Stage of International Patent Application No. PCT/EP2018/076739, filed Oct. 2, 2018, which claims the benefit of European Patent Application No. 17195387.0, filed Oct. 9, 2017, which are each incorporated by reference.

TECHNICAL FIELD

The invention relates generally to an apparatus and to a method for fastening a stud to a substrate and also to such a stud.

BACKGROUND OF THE INVENTION

There are numerous known apparatuses and methods by which various studs are fastened to a substrate in different applications. For example, a stud is brought into contact with the substrate and an electric current is applied to it. As soon as the electric current flows between the stud and the substrate, the stud is lifted off the substrate to form an arc. The energy that is released causes the material of the stud and of the substrate to be partially liquefied. The electric current is then switched off and the stud is immersed in the liquefied material while this material cools down and becomes solid. The stud is then connected to the substrate in an integrally bonded manner.

In order to provide the necessary energy for liquefying the material of the stud and the substrate in a sufficiently short time, there are known apparatuses that generate an electric current of a very high current intensity and use a correspondingly rated electric cable to feed it to the stud. To avoid oxidizing of the liquefied material, it is known to surround the area of contact between the stud and the substrate with an inert gas.

In the case of applications in building construction or shipbuilding for example, threaded studs of various sizes to which an item is screwed are used in order to fasten the item to the substrate. Some parameters of the fastening method, such as for example the duration and electrical power of the electric current, are to be set by a user on the apparatus and are to be adapted to the stud that is used. The user finally assesses the quality of the connection between the stud and the substrate by means of a visual inspection. The quality of the connection consequently also depends on the experience and capabilities of the user.

In the case that the substrate has a surface layer, such as for example a coating, a corrosion protection or a dirt layer, this surface layer is customarily ground over a large area before fastening the stud. After fastening the stud, the ground region is cleaned and/or provided with a new coating or corrosion protection layer, which is time-consuming.

BRIEF SUMMARY OF THE INVENTION

The object of the invention is to provide an apparatus and/or a method with which fastening of a stud to a substrate is made easier and/or improved.

This object is achieved in a method for fastening a stud to a substrate having a surface layer, in which a stud, which has a stud diameter at an end side, and an annular covering element having an inside diameter and an outside diameter are provided, a recess is created in the substrate by removing the surface layer in a defined surface region having a surface diameter, wherein the surface diameter is greater than the stud diameter and less than the outside diameter, the end side and/or the substrate are/is liquefied and allowed to solidify in the recess, the end side is contacted with the substrate in the recess during solidification, and the recess around the stud is covered by means of the covering element. The surface layer in the defined surface region is preferably removed by being machined. By virtue of the fact that the substrate is covered at the location where the surface layer has been removed, a repair of the surface layer is not required under certain circumstances or is at least simplified.

One advantageous embodiment is characterized in that the end side and/or the covering element and/or the defined surface region are/is circular.

A further advantageous embodiment is characterized in that the recess is a blind hole.

A further advantageous embodiment is characterized in that the recess is drilled by means of a preferably hand-operated drilling tool.

A further advantageous embodiment is characterized in that the recess has a centering contour and the end side has a mating contour, wherein the centering contour and the mating contour engage in one another when the stud is placed at the desired position in the recess. With preference, the centring contour is convex and the mating contour is concave. Likewise with preference, the centring contour is concave and the mating contour is convex. With particular preference, the mating contour comprises the entire end side.

A further advantageous embodiment is characterized in that the covering element comprises a sealing ring having a sealing ring inside diameter and a sealing ring outside diameter, wherein the sealing ring inside diameter is less than or equal to the stud diameter and the sealing ring outside diameter is greater than the surface diameter. The sealing ring then seals radially with respect to the stud and axially with respect to the substrate outside the defined surface region, with the result that the joint between the stud and the substrate is completely sealed in relation to the surroundings.

A further advantageous embodiment is characterized in that the covering element is fastened to the stud after the stud has been fastened to the substrate. The covering element is preferably screwed or plugged onto the stud. An alternative embodiment is characterized in that the covering element is premounted on the stud before the stud is fastened to the substrate.

A further advantageous embodiment is characterized in that, during liquefaction and/or solidification of the material of the stud or of the substrate, the covering element is likewise partially or completely liquefied and forms an integrally bonded connection with the stud and/or the substrate.

A further advantageous embodiment is characterized in that the covering element is deformed after the stud has been fastened to the substrate.

A further advantageous embodiment is characterized in that the covering element is changed in its position on the stud after the stud has been fastened to the substrate.

BRIEF DESCRIPTION OF THE SEVERAL VIEWS OF THE DRAWING(S)

The invention will be explained in more detail below on the basis of exemplary embodiments with reference to the drawings. In the drawings:

FIG. 1 schematically shows a welding apparatus,

FIG. 2 shows a fastening arrangement in a cross-sectional view,

FIG. 3 shows a further fastening arrangement in a cross-sectional view,

DETAILED DESCRIPTION OF THE INVENTION

Figure 1:
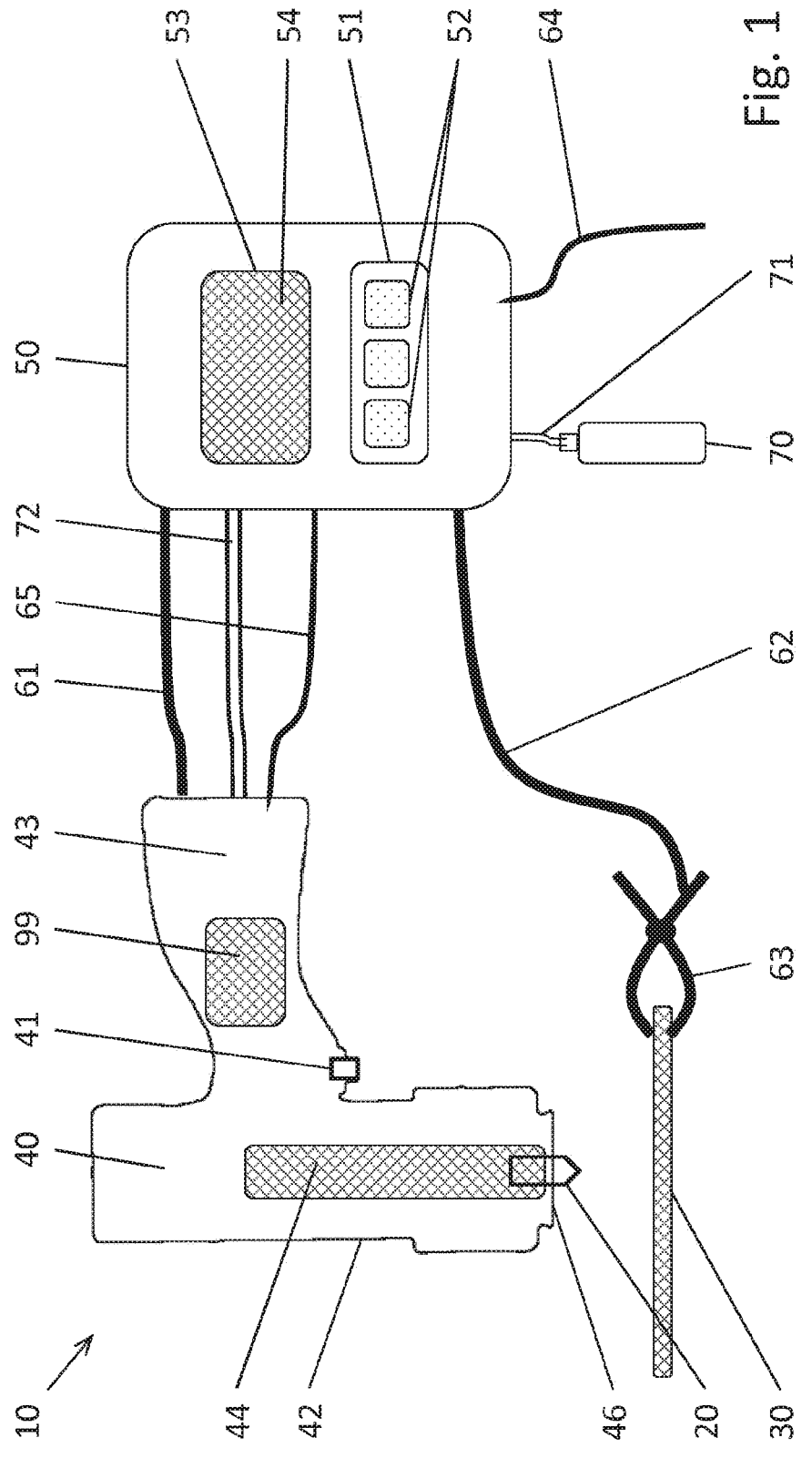

FIG. 1 schematically illustrates a welding apparatus 10 for welding a welding stud 20 to a substrate 30. A material of the welding stud 20 and a material of the substrate 30 are electrically conductive, in particular metallic. The welding apparatus 10 comprises a welding gun 40 with a trigger switch 41, formed as a pushbutton switch, a welding unit 50, a first electric cable 61, a second electric cable 62 with a connection terminal 63, an electric supply cable 64, formed for example as a power cable, an electrical communication line 65, a gas reservoir 70, formed as a gas cylinder, a tubular gas supply line 71 and a gas hose 72.

The first cable 61 serves for supplying the welding stud 20 with electric current through the welding unit 50. The second cable 62 serves for electrically connecting the substrate 30 to the welding unit 50 when the connection terminal 63 is clamped to the substrate 30. When the welding stud 20 comes into contact with the substrate 30, a circuit closes, so that welding current, for example in the form of direct current or alternating current, can be applied to the welding stud 20 by the welding unit 50. For this purpose, the welding gun 40 comprises a welding-current contact element that is not shown in FIG. 1. The welding unit 50 comprises a device that is not shown for converting electric current from the supply cable 64 into welding current, which comprises for example an electrical capacitor, a thyristor, a bipolar transistor with an isolated gate electrode or other components from power electronics and also an associated control unit with a microprocessor, in order to provide the welding current at the desired voltage and current intensity.

The gas supply line 71 and the gas hose 72 serve for supplying a contact region between the welding stud 20 and the substrate 30 with an inert gas from the gas reservoir 70, in order to protect the contact region from oxidation due to oxygen from the surroundings during a welding operation. For controlling a gas flow to the contact region, the gas reservoir 70, the gas supply line 71, the welding unit 50, the gas hose 72 or the welding gun 40 comprises a valve, in particular a controllable valve, that is not shown.

The welding unit 50 has an input device 51 with actuating elements 52 and also an output device 53 with a visual display element 54 and a wireless transmission unit. The input device 51 serves for inputting parameters of a welding process to be carried out with the welding apparatus 10, such as for example the electrical voltage, current intensity, power and duration of the welding current, position and speed of the stud and so on, by a user of the welding apparatus 10. The output device 53 serves for outputting information to the user, such as for example information on parameters of the welding process, information on detected emissions of the welding process or other variables, information on a quality of the welding operation, information on measures for improving the welding operation, information on detected characteristics of the welding stud or information derived from the aforementioned variables, and/or recommendations or instructions for cleaning and/or maintaining the welding apparatus 10, in particular the welding gun 40.

The communication line 65 serves for communication between the welding gun 40, in particular a control device of the welding gun 40 that is not shown in FIG. 1, and the welding unit 50, in particular the control unit and/or the input device 51 and/or the output device 53. By means of this communication, for example, an exchange of information about the parameters of a welding operation is accomplished, in order for example to achieve or facilitate a synchronization of the welding current with a movement of the welding stud 20. In the case of exemplary embodiments that are not shown, the communication between the welding gun and the welding unit takes place wirelessly, by radio or by means of the first electric cable, which carries the welding current.

The welding gun 40 has a housing 42 with an opening 46, from which housing a handle 43 with the trigger switch 41 protrudes. The welding gun 40 also has a stud holder 44, on which the welding stud 20 is held during a welding operation. For this purpose, the stud holder comprises for example two, three, four or more resilient arms that are not shown in detail, between which the welding stud 20 is inserted and held by means of a clamping fit. The welding gun 40 also has, for applying a welding current to the welding stud 20, a welding-current contact element which is integrated in the stud holder 44, for example in the form of one or more of the resilient arms.

The welding gun 40 also has a control device 99 for controlling the various components and devices of the welding gun and of the welding unit 50. The control device 99 is intended for controlling one or more parameters of the welding operation. For this purpose, the control device 99 comprises various electronic components, such as for example one or more microprocessors, one or more temporary or permanent data memories, and the like.

The welding gun 40 also has a stud lifting device, which is formed as a first lifting magnet, which acts on the stud holder 44 with a force away from the opening 46 to the rear (upwardly in FIG. 1) when the stud lifting device is activated. Via a signal line that is not shown, the control device 99 communicates with the stud lifting device in order to control the stud lifting device, in particular to activate and deactivate it.

The welding gun 40 also has a stud immersing device, formed as a spring element or as a second lifting magnet, which acts on the stud holder 44 forwardly with a force toward the opening 46 (downwardly in FIG. 1) when the stud immersing device is activated. Via a signal line that is not shown, the control device 99 communicates with the stud immersing device in order to control the stud immersing device, in particular to activate and deactivate it. If the stud immersing device takes the form of a spring element, this spring element is preferably tensioned when the stud holder is moved by the stud lifting device to the rear, with the result that the spring element moves the stud holder forward as soon as the stud lifting device is deactivated.

In a welding process with the welding apparatus 10, at first the substrate 30 and the stud 20 are provided. In a further step, information, for example about desired parameters of the following welding operation, are input by a user via the input device. In a further step, a welding current between the welding stud 20 and the substrate 30 is applied to the welding stud 20 by the welding unit 50 by means of the first cable 61 and the second cable 62. In a further step, the welding stud 20 is lifted off the substrate by means of the stud lifting device while maintaining the welding current flowing between the welding stud 20 and the substrate 30, with an arc being formed between the welding stud 20 and the substrate 30. Particularly on account of the heat generated by the arc, a material of the welding stud 20 and/or of the substrate 30 is then partially liquefied. In a further step, the welding stud 20 is immersed by means of the stud immersing device in the liquefied material of the welding stud 20 or of the substrate 30. The liquefied material of the welding stud 20 or of the substrate 30 then solidifies such that the welding stud 20 is connected to the substrate 30 in an integrally bonded manner.

FIG. 2 illustrates a fastening arrangement with a welding stud 120 and a substrate 130 during a welding operation. The substrate 130 has a surface layer 140 which comprises for example a protective layer, in particular against corrosion, an oxide layer, in particular metal oxide layer, or a dirt layer. At an end side 121 of the welding stud 120, the welding stud has a stud diameter 122 of for example 8 mm, the end side 121 being convex and having the form of a flat cone lateral surface and/or having a circular cross-sectional area. In a defined circular surface region 131 having a surface diameter 132, the substrate 130 has a recess 133 in the form of a blind hole having a blind hole depth 134. The surface diameter 132 is for example 20 mm and is greater than the stud diameter 122.

The recess 133 has a constant depth in its radially outer edge region, this depth being equal to a thickness of the surface layer 140. In a radially inner central region, the recess 133 is concave in form and has a likewise concave centering contour 135. The tip of the conical end side 121 of the welding stud 120 forms a convex mating contour 125, with the result that the centering contour 135 and the mating contour 125 engage in one another when the welding stud 120 is placed at the desired position in the recess 133. In an exemplary embodiment that is not shown, the centering contour is convex and the mating contour is concave. The concave formation of the recess 133 makes it easier to locate the desired welding point by the welding stud feeling its way toward the recess 133.

To create the recess 133, the surface layer 140 has been removed in the defined surface region 131 by having been machined by drilling by means of a drilling tool. The drilling tool is preferably a step drill which has a peripheral step whose axial distance from a drilling tip of the step drill is equal to the desired blind hole depth 134.

The welding stud 120 has a supporting means 150 in the form of a peripheral depression which supports a covering element (not shown) against the substrate 130 when the covering element is fastened to the welding stud 120 after the welding stud 120 has been fastened to the substrate 130. The covering element is designed for example as one of the covering elements illustrated in FIGS. 4 to 6 and has an outside diameter of for example 30 mm, which is greater than the surface diameter 132 in order that the joint between the welding stud 120 and the substrate 130 and also the recess 133 around the welding stud 120 are completely covered by the covering element. The covering element is screwed onto the welding stud 120.

FIG. 3 illustrates a fastening arrangement with a welding stud 220 and a substrate 230 in a further exemplary embodiment during a welding operation. The substrate 230 has a surface layer 240 which comprises for example a protective layer, in particular against corrosion, an oxide layer, in particular metal oxide layer, or a dirt layer. At an end side 221 of the welding stud 220, the welding stud has a stud diameter 222 of for example 6 mm, the end side 221 being planar and having a circular cross-sectional area. In a defined circular surface region 231 having a surface diameter 232, the substrate 230 has a recess 233 in the form of a blind hole having a blind hole depth 234. The surface diameter 232 is for example 18 mm and is greater than the stud diameter 222.

The recess 233 has a constant depth in its radially outer edge region, this depth being equal to a thickness of the surface layer 240. In a radially inner central region, the recess 233 is of concave form and has a likewise concave centering contour 235 whose diameter is substantially the same size as the stud diameter 222, with the result that the centering contour 235 and the end side 221 engage in one another when the welding stud 220 is placed at the desired position in the recess 233. This makes it easier to locate the desired welding point by the welding stud feeling its way toward the recess 233.

The welding stud 220 has a supporting means 250 in the form of a peripheral depression which supports a covering element (not shown) against the substrate 230 when the covering element is fastened to the welding stud 220 after the welding stud 220 has been fastened to the substrate 230. The covering element has an outside diameter of for example 25 mm, which is greater than the surface diameter 232 in order that the joint between the welding stud 220 and the substrate 230 and also the recess 233 around the welding stud 220 are completely covered by the covering element. The covering element is plugged onto the welding stud 220.

Figure 4:
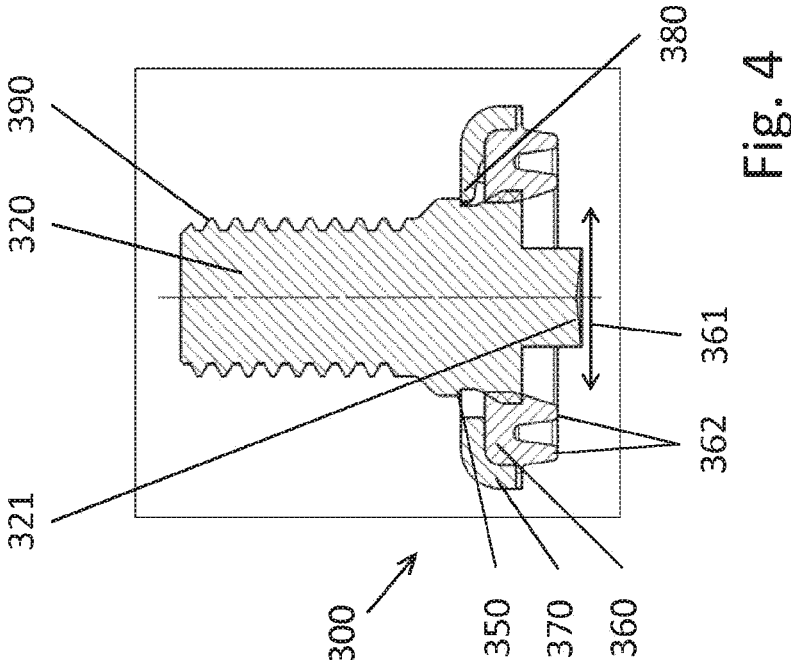
FIG. 4 shows a welding stud in a longitudinal sectional view.

FIG. 4 illustrates a welding stud 320 having a covering element 300 in a longitudinal section. The welding stud 320 has a concave end side 321 in the form of a flat cone lateral surface and with a circular cross-sectional area. Furthermore, the welding stud has an attachment means 390 in the form of an external thread with a thread diameter for attaching an add-on element to the welding stud 320. Furthermore, the welding stud 320 has a supporting means 350 in the form of a peripheral depression which supports the covering element 300 against a substrate (not shown) when the welding stud 320 is fastened to the substrate.

The covering element 300 comprises a circular sealing ring 360 having a sealing ring inside diameter 361 and a sealing ring outside diameter and also comprises a likewise circular-ring-shaped covering disk 370. The sealing ring inside diameter 361 is greater than the thread diameter of the attachment means 390 in order that the sealing ring 360 can be moved over and beyond the attachment means 390. The covering element 300, in particular the covering disk 370, has a mating supporting means 380 which, in order to support the covering element 300 against the substrate, is in engagement with the supporting means 350 of the welding stud 320. The mating supporting means 380 comprises one or more projections which are arranged along a circumference and protrude radially inwardly from the covering disk 370.

The covering element 300 has already been premounted on the welding stud 320 before fastening the welding stud 320 to the substrate in such a way that the sealing ring 360 bears with the sealing ring inside diameter 361 against the welding stud 320. In an exemplary embodiment that is not shown, the covering element is indeed premounted on the welding stud before fastening but is brought into its final position after fastening, for example by being displaced in the fastening direction. After fastening the welding stud 320 to the substrate, the sealing ring 360 seals radially with respect to the welding stud 320 and axially with respect to the substrate, with the result that the joint between the welding stud 320 and the substrate is completely sealed in relation to the surroundings.

For improved axial sealing with respect to the substrate, the sealing ring 360 has two peripheral axial projections 362 which are deformed when the stud is fastened to the substrate. Additionally or alternatively, the material of the sealing ring 360 is likewise partially or completely liquefied during the liquefaction and/or solidification of the material of the welding stud 320 or of the substrate and, upon solidification, forms an integrally bonded connection with the welding stud 320 and/or the covering disk 370 and/or the substrate.

Figure 5:
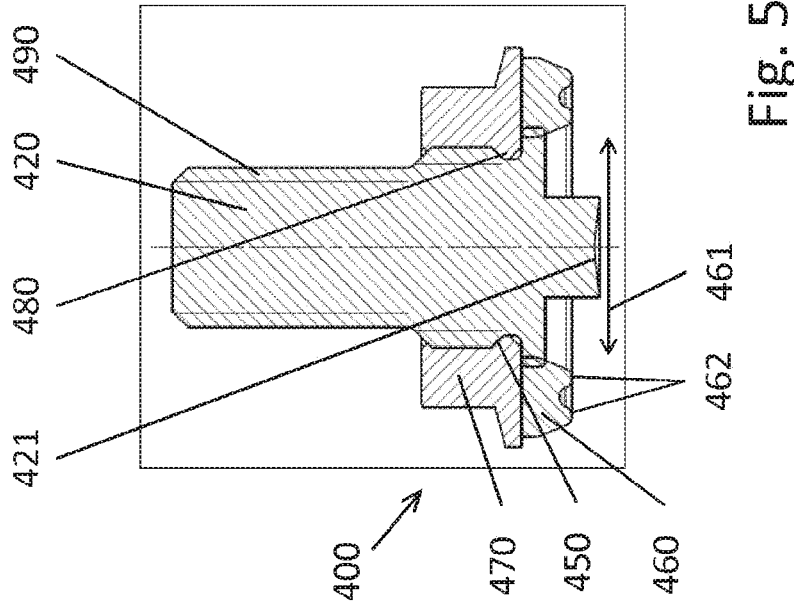
FIG. 5 shows a further welding stud in a longitudinal sectional view.

FIG. 5 illustrates a welding stud 420 having a covering element 400 in a longitudinal section. The welding stud 420 has a concave end side 421 in the form of a flat cone lateral surface and with a circular cross-sectional area. Furthermore, the welding stud has an attachment means 490 in the form of an external thread with a thread diameter for attaching an add-on element to the welding stud 420. Furthermore, the welding stud 420 has a supporting means 450 in the form of a peripheral depression which supports the covering element 400 against a substrate (not shown) when the welding stud 420 is fastened to the substrate.

The covering element 400 comprises a circular sealing ring 460 having a sealing ring inside diameter 461 and a sealing ring outside diameter and also comprises a covering disk 470. The covering element 400, in particular the covering disk 470, has a mating supporting means 480 which takes the form of a peripheral projection protruding radially inwardly from the covering element 400 and which, in order to support the covering element 400 against the substrate, is in engagement with the supporting means 450 of the welding stud 420.

The covering element 400 has already been premounted on the welding stud 420 before fastening the welding stud 420 to the substrate in such a way that the sealing ring 460 bears with the sealing ring inside diameter 461 against the welding stud 420. After fastening the welding stud 420 to the substrate, the sealing ring 460 seals radially with respect to the welding stud 420 and axially with respect to the substrate, with the result that the joint between the welding stud 420 and the substrate is completely sealed in relation to the surroundings.

For improved axial sealing with respect to the substrate, the sealing ring 460 has two peripheral axial projections 462 which are deformed when the stud is fastened to the substrate. Additionally or alternatively, the material of the sealing ring 460 is likewise partially or completely liquefied during the liquefaction and/or solidification of the material of the welding stud 420 or of the substrate and, upon solidification, forms an integrally bonded connection with the welding stud 420 and/or the covering disk 470 and/or the substrate.

Figure 6:
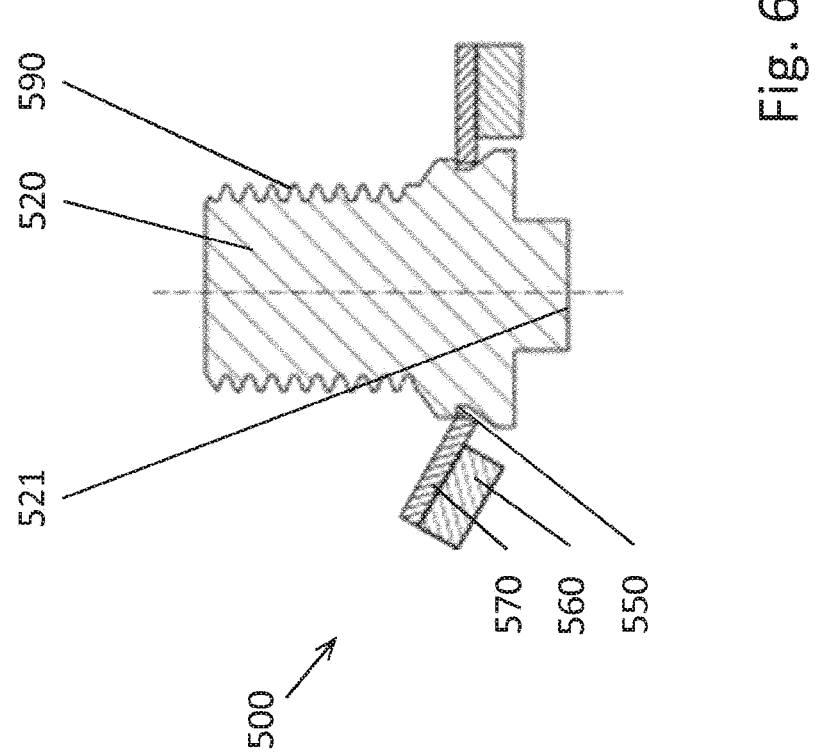
FIG. 6 shows a further welding stud in a longitudinal sectional view.

FIG. 6 illustrates a welding stud 520 having a covering element 500 in a longitudinal section. The welding stud 520 has a planar end side 521 with a circular cross-sectional area. Furthermore, the welding stud has an attachment means 590 in the form of an external thread with a thread diameter for attaching an add-on element to the welding stud 520. Furthermore, the welding stud 520 has a supporting means 550 in the form of a peripheral depression which supports the covering element 500 against a substrate (not shown) when the welding stud 520 is fastened to the substrate. The covering element 500 comprises a circular sealing ring 560 and a likewise circular-ring-shaped covering disk 570.

The covering element 500 has already been premounted on the welding stud 520 in the position illustrated on the left in FIG. 6 before fastening the welding stud 520 to the substrate. After fastening, the covering element 500 is brought into its final position illustrated on the right in FIG. 6, for example by being folded down in the fastening direction or being deformed in some other way. The deformation is accomplished for example by a user, in particular with the aid of a tool, or already during the fastening operation particularly as a result of thermal deformation or by means of a device provided for this purpose on the welding gun.

In one or more of the exemplary embodiments, the sealing ring is produced from an elastomer, with the covering disk being produced from metal or ceramic.

The invention has been described on the basis of examples of an apparatus for fastening a first item to a second item and a production method for such an apparatus. The features of the described embodiments can also be combined as desired with one another within a single fastening device or a single production method. It is pointed out that the apparatus according to the invention and the method according to the invention are also suitable for other purposes.

The invention claimed is:

1. A method for fastening a stud to a substrate having a surface layer, comprising:
   a) providing the stud which has a stud diameter at an end side;
   b) providing an annular covering element having an inside diameter and an outside diameter;
   c) creating a recess in the substrate by removing the surface layer in a defined surface region having a surface diameter, wherein the surface diameter is greater than the stud diameter and less than the outside diameter of the annular covering element;
   d) liquefying the end side of the stud and/or the substrate in the recess,
   e) allowing the end side of the stud or the substrate in the recess to solidify,
   f) contacting the end side of the stud with the substrate in the recess during solidification, and
   g) completely covering the recess around the stud by the covering element.

2. The method as claimed in claim 1, in which the end side of the stud is circular.

3. The method as claimed in claim 1, wherein the recess is a blind hole.

4. The method as claimed in claim 1, wherein the recess is drilled by a drilling tool.

5. The method as claimed in claim 1, wherein the recess has a centering contour and the end side of the stud has a mating contour, wherein the centering contour and the mating contour engage in one another when the stud is placed at a desired position in the recess.

6. The method as claimed in claim 5, wherein the centering contour is concave and the mating contour is convex.

7. The method as claimed in claim 1, in which the covering element comprises a sealing ring having a sealing ring inside diameter and a sealing ring outside diameter, wherein the sealing ring inside diameter is less than or equal to the stud diameter and the sealing ring outside diameter is greater than the surface of the defined surface region.

8. The method as claimed in claim 1, in which the covering element is fastened to the stud after d), e) and f) have been carried out.

US 12,599,984 B2

9

9. The method as claimed in claim 8, in which the covering element is screwed or plugged onto the stud.

10. The method as claimed in claim 1, wherein the covering element is premounted on the stud before d), e) and f) have been carried out.

11. The method as claimed in claim 10, in which, during at least one of d), e) and f), the covering element is partially or completely liquefied and forms an integrally bonded connection with the stud and the substrate.

12. The method as claimed in claim 10, in which the covering element is deformed after d), e) and f) have been carried out.

13. The method as claimed in claim 10, in which the covering element is changed in a position on the stud after d), e) and f) have been carried out.

14. The method of claim 1, wherein c) comprises creating the recess in the substrate by machining the surface area in the defined surface region.

15. The method as claimed in claim 2, wherein the recess is a blind hole.

16. The method as claimed in claim 2, wherein the recess is drilled by a drilling tool.

17. The method as claimed in claim 3, wherein the recess is drilled by a drilling tool.

18. The method as claimed in claim 2, wherein the recess has a centering contour and the end side of the stud has a mating contour, wherein the centering contour and the mating contour engage in one another when the stud is placed at a desired position in the recess.

19. The method as claimed in claim 1, in which the covering element is circular.

20. The method as claimed in claim 1, in which the defined surface region is circular.

21. The method as claimed in claim 1, further comprising completely sealing a joint between the stud and the substrate from surroundings by the covering element.

\* \* \* \* \*